June 18, 1968  J. S. BINEK  3,388,550
TURBINE ENGINE EXHAUST DUCT
Filed Nov. 14, 1966  2 Sheets-Sheet 1
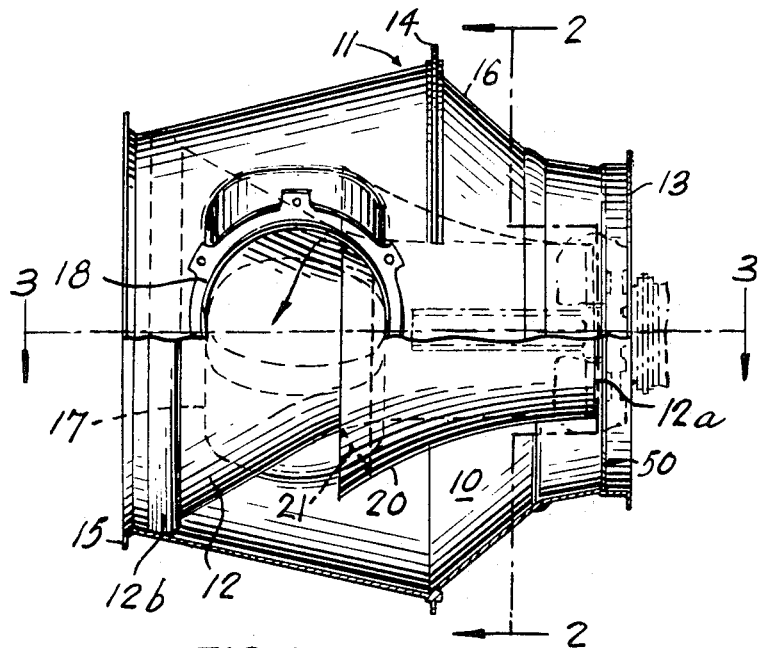
FIG. 1
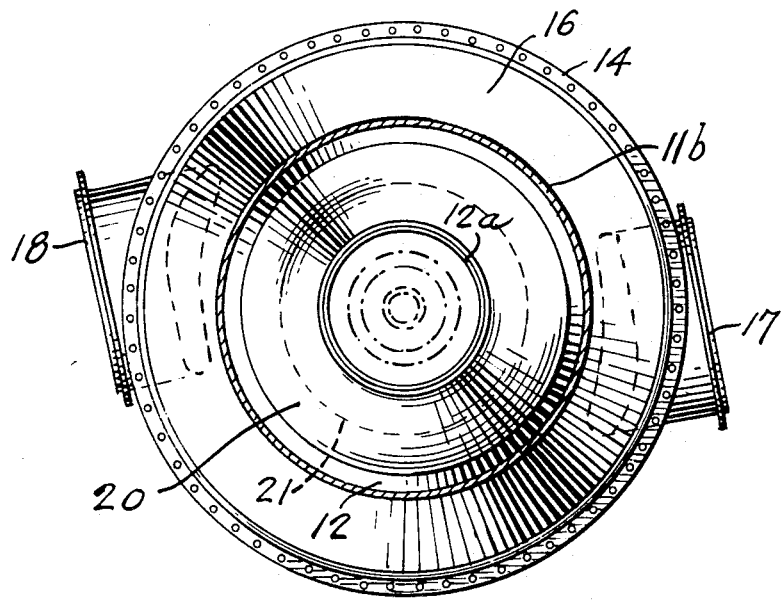
FIG. 2
INVENTOR
John S. BINEK
ATTORNEY June 18, 1968 J. S. BINEK 3,388,550
TURBINE ENGINE EXHAUST DUCT Filed Nov. 14, 1966 2 Sheets-Sheet 2

INVENTOR
John S. BINEK

ATTORNEY

United States Patent Office 3,388,550
Patented June 18, 1968

3,388,550
TURBINE ENGINE EXHAUST DUCT
John Sylvester Binek, Montreal, Quebec, Canada, assignor to United Aircraft of Canada Limited, Quebec, Canada
Filed Nov. 14, 1966, Ser. No. 593,952
11 Claims. (Cl. 60—39.5)

ABSTRACT OF THE DISCLOSURE

An improved exhaust system for reducing back pressure on a gas turbine engine comprising an exhaust duct having an upstream end aligned with the turbine casing and a downstream portion having lateral, peripherally distributed outlets.

---

The present invention relates to exhaust arrangements for turbine engines and in particular to an exhaust arrangement for a gas turbine engine having an axial flow turbine stage from which gas exhausts with both axial and tangential velocities into an annular exhaust duct having an upstream end generally aligned with the turbine blades and leading to lateral, peripherally distributed outlets.

Gas turbine engines of the above type encounter exhaust problems which do not arise in through-flow turbine engines. In particular, since the gases flow axially, with a spiral component out of the engine, they have to be turned through an angle of approaching 90° so as to be exhausted sideways, and this tends to generate a back pressure which has adverse effects on the engine's efficiency and output.

Co-pending U.S. patent application Ser. No. 417,996, now Patent No. 3,290,877 (Millar), describes and claims an improved exhaust system for engines of the type described, in which the exhaust system is constructed with vanes past which the gas is caused to flow before reaching the exhaust ports. The vanes are so arranged that the gas is guided towards the tangential direction with its axial velocity diminished. The gas flows through the vanes directly into an exhaust volute or scroll and is permitted to expand into the volute in the wall of which the exhaust ports are located.

While the device of U.S. patent application Ser. No. 417,996, now Patent No. 3,290,877, is efficient in reducing back pressure, it suffers from the disadvantage that the exhaust system is complicated and expensive to construct. Furthermore, the vanes are subject to mechanical failure.

It is an object of the present invention to provide an improved exhaust system for turbine engines of the type described and in which back pressure is substantially reduced, while construction is at the same time simplified and reduced in cost.

Further disadvantages of the exhaust system of co-pending application Ser. No. 417,996, now Patent No. 3,290,877, arise out of the complexity itself, which is undesirable in aircraft engines. Additionally, the vane structure tends to allow separated and disturbed flow to migrate upstream and to interfere with the main flow diffusion process. It is a further object of the present invention to provide a simple but efficient exhaust structure which reduces the above disadvantages as much as possible.

In accordance with one aspect of the invention, there is provided in a gas turbine engine having an axial flow turbine stage from which gas exhausts with both axial and tangential velocities into an annular exhaust duct having an upstream end generally aligned with the turbine blades and leading to lateral, peripherally distributed outlets, the improvement comprising:

An inner downstream flaring wall defining the inner boundary of said duct and having downstream and upstream ends, An outer wall defining the outer boundary of said duct, and having an upstream section and a downstream section, Said upstream section having a downstream flare steeper than the downstream flare of said inner wall, and having a downstream end spaced upstream of the downstream end of said inner wall, Said downstream section extending between the downstream ends of said inner wall and said upstream section, and having lateral, peripherally distributed outlets, An intermediate fairing wall having an upstream end coterminous with the upstream end of said inner wall, a downstream flare which is intermediate in steepness between the flares of said inner wall and said upstream section, and a downstream end located upstream of the downstream end of said inner wall and stepped outwardly from said inner wall, and Structural support means connecting said fairing wall to said inner wall near the downstream end of said inner wall.

Preferably, the support means take the form of a continuous annular web having an inner rim sealed to said inner wall and an outer rim sealed to said fairing wall.

Having generally described the invention, further details and advantages will become apparent from the following description in greater detail of a preferred embodiment illustrated in the accompanying drawings in which:

FIGURE 1 is an axial end view, viewed in the direction of exhaust flow, of an exhaust casing constructed in accordance with the present invention;

FIGURE 2 is a longitudinal view partly in elevation and partly in section along the line 2—2 of FIGURE 1.

Figure 3:
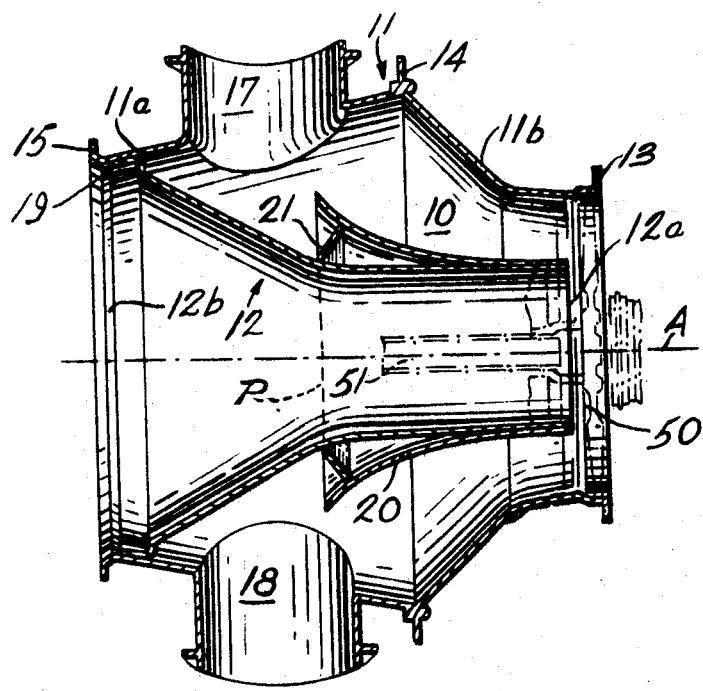
FIGURE 3 is a longitudinal section along the line 3—3 of FIGURE 1.

The exhaust casing illustrated includes a duct 10 of annular cross-section defined between an outer wall 11 and an inner wall 12, the walls being composed of heat resistant steel. The outer wall comprises a convergent downstream section 11a and a divergent upstream section 11b. The upstream section 11b is bounded by two annular flanges 13 and 14, the flanges being adapted to be bolted to corresponding flanges of the combustion and turbine stages respectively of a gas turbine engine. The downstream section 11a is bounded upstream by the flange 14 and terminates in the downstream direction in a flange 15 adapted to be bolted to the corresponding flange of a reduction gear box (not shown). Exhaust outlets or ports 17 and 18 extend outwardly from the downstream outer wall section 11a, substantially at right angles to the axis A of the turbine axial flow stage indicated at 50. As illustrated in FIGURE 1, the exhaust ports 17 and 18 are slightly offset in the cross-sectional plane to permit the exhausted gas to escape in partly tangential directions, allowing for the residual swirl of the gas.

The inner annular wall 12 flares downstream from upstream end 12a to downstream end 12b, the flare being less than that of upstream section 11b, but increasing in steepness at a cross-sectional plane P. The plane P is located between the upstream and downstream bounding planes of the exhaust ports 17 and 18 and preferably as shown slightly downstream of the upstream boundary plane of the ports. The downstream end 12b of inner wall 12 terminates in a flange 19 which is secured, for example, by welding to the downstream section 11a of the outer wall 11. The upstream end 12a may be supported from the turbine axle 51 by a suitable bearing structure (not shown).

Located between the inner and outer walls defining the duct 10, is an intermediate fairing wall 20, also of heat resistant steel, secured at its upstream end to the inner wall 12 so as to terminate therewith and which flares downstream more steeply than the inner wall 12, but less steeply than rear outer section 11b, so as to terminate at plane P intermediate the inner and outer walls of the duct. The intermediate fairing wall 20 is structurally supported at its downstream end from the inner wall 12 by means of a continuous annular web 21 also of heat resistant steel. At the termination of fairing wall 20, an abrupt step is formed in the resultant inner surface of the duct 10. The web 21 is shown frustoconical in shape with an inner rim sealed, for example, by welding to the inner wall 12 substantially at the plane P and its outer rim sealed also, for example, by welding to the inside surface of the fairing wall 20 at a position slightly upstream of the plane P, that is, adjacent but upstream of the downstream boundary of the wall 20.

In operation, exhaust gas leaves the blades of the turbine rear stage 50 and enters the upstream end of the annular duct 10 with axial and rotational velocity. The gas expands or diffuses in the expanding portion of the ducts between the rear outer wall section 11b and the fairing wall 20. As the gas expands, the swirl velocity (Cu) of the gas is reduced due to the increase in radius of the main stream line in the flow direction, the gas satisfying the free vortex flow equation:

$$Cu \times r = Constant$$

The step in the inner wall constituted between the end of the fairing wall 20 and the downstream portion of the inner wall 20 has been found to promote good diffusion of the exhaust gas in the meridional direction within the duct. Simultaneously with reduction in swirl velocity, gas is led by the fairing wall 20 directly towards the outlets 17 and 18 but without compression. The abruptly expanded volute forward of the step in the inner wall acts as a trap preventing disturbed flow from migrating upstream so as to interfere with the main flow and diffusion process.

It will be apparent that these benefits are obtained by means of a relatively simple and economic construction of the exhaust casing.

It will be further apparent to one skilled in the art that many modifications may be made to the device illustrated, within the scope of the following claims.

I claim:

1. In a gas turbine engine having an axial flow turbine stage from which gas exhausts with both axial and tangential velocities into an annular exhaust duct having an upstream end generally aligned with the turbine blades and leading to lateral, peripherally distributed outlets, the improvement comprising:
   an inner downstream flaring wall defining the inner boundary of said duct and having downstream and upstream ends,
   an outer wall defining the outer boundary of said duct, and having an upstream section and a downstream section,
   said upstream section having a downstream flare steeper than the downstream flare of said inner wall, and having a downstream end spaced upstream of the downstream end of said inner wall,
   said downstream section extending between the downstream ends of said inner wall and said upstream section, and having lateral, peripherally distributed outlets,
   an intermediate fairing wall having an upstream end coterminous with the upstream end of said inner wall, a downstream flare which is intermediate in steepness between the flares of said inner wall and said upstream section, and a downstream end located upstream of the downstream end of said inner wall and stepped outwardly from said inner wall, and
   structural support means connecting said fairing wall to said inner wall near the downstream end of said inner wall.

2. The improvement of claim 1 wherein said support means take the form of a continuous annular web having an inner rim sealed to said inner wall and an outer rim sealed to said fairing wall.

3. The improvement of claim 2 wherein said outer rim is sealed to the adjacent inner surface of said fairing wall at a point at or near said downstream end thereof.

4. The improvement of claim 3 wherein said point is adjacent but spaced upstream of said downstream end of said fairing wall.

5. The improvement of claim 2 wherein said inner rim lies on a radial plane through said downstream end of said fairing wall.

6. The improvement of claim 1 wherein said fairing wall terminates downstream within the downstream and upstream boundary planes of said outlets.

7. The improvement of claim 6 wherein said fairing wall terminates slightly downstream of the upstream boundary plane of said outlets.

8. The improvement of claim 1 wherein two generally diametrically opposed outlets are provided.

9. The improvement of claim 1 wherein two generally diametrically opposed outlets are provided, the outlets being offset so as to be partly tangentially directed with respect to the turbine axis.

10. The improvement of claim 7 wherein two generally diametrically opposed outlets are provided.

11. The improvement of claim 7 wherein two generally diametrically opposed outlets are provided, the outlets being offset so as to be partly tangentially directed with respect to the turbine axis.

References Cited

UNITED STATES PATENTS 3,290,877  12/1966  Millar _____ 60—39.5

CARLTON R. CROYLE, *Primary Examiner.*